US012710902B2

(12) United States Patent
Sonogi

(10) Patent No.: US 12,710,902 B2
(45) Date of Patent: Aug. 18, 2026

(54) INFORMATION PROCESSING APPARATUS AND METHOD OF CONTROLLING THE SAME, AND STORAGE MEDIUM STORING PRINT EXPANSION PROGRAM

(71) Applicant: CANON KABUSHIKI KAISHA, Tokyo (JP)

(72) Inventor: Katsutoshi Sonogi, Chiba (JP)

(73) Assignee: CANON KABUSHIKI KAISHA, Tokyo (JP)

(*) Notice: Subject to any disclaimer, the term of this patent is extended or adjusted under 35 U.S.C. 154(b) by 329 days.

(21) Appl. No.: 18/628,453

(22) Filed: Apr. 5, 2024

(65) Prior Publication Data

US 2024/0338152 A1 Oct. 10, 2024

(30) Foreign Application Priority Data

Apr. 10, 2023 (JP) ................................ 2023-063618

(51) Int. Cl.
*G06F 3/12* (2006.01)

(52) U.S. Cl.
CPC .......... *G06F 3/1205* (2013.01); *G06F 3/1229* (2013.01); *G06F 3/1253* (2013.01)

(58) Field of Classification Search
None
See application file for complete search history.

(56) References Cited

U.S. PATENT DOCUMENTS

2024/0036787 A1* 2/2024 Hidaka ................. G06F 3/1205
2024/0069818 A1* 2/2024 Yasuda ................. G06F 3/1253

FOREIGN PATENT DOCUMENTS

JP 2020087255 A 6/2020

* cited by examiner

*Primary Examiner* — Dov Popovici
(74) *Attorney, Agent, or Firm* — Canon U.S.A., Inc. IP Division

(57) ABSTRACT

An information processing apparatus executes an application program that is installed on an operating system (OS) configured to obtain printer capability information from a target printing apparatus. The apparatus obtains capability information from the target printing apparatus in a case where an event is notified from the OS, edits device capability information stored in the OS based on the obtained capability information, displays a print setting screen based on the edited device capability information, determines whether intermediate data including a print setting set via the print setting screen includes a predetermined function that is related to image inversion and not supported by the OS, in a case where the intermediate data includes the predetermined function, edits the intermediate data such that the predetermined function is realized, and generates print data based on the edited intermediate data.

13 Claims, 20 Drawing Sheets

FIG. 5

| | ITEM NAME | ATTRIBUTE VALUE |
|---|---|---|
| 501 | PAPER SIZE | A6 / A5 / A4 / B5 / Letter / Legal / Executive / POSTCARD / #10 Envelope PORTRAIT /DL Envelope PORTRAIT / ENVELOPE (WESTERN-STYLE NO. 4) PORTRAIT / ENVELOPE (LONG NO. 3) PORTRAIT / ENVELOPE (LONG NO. 4) PORTRAIT / ENVELOPE Envelope C5 PORTRAIT / ENVELOPE Envelope Monarch PORTRAIT / L / 4x6 (KG SIZE) / 5x7 / HOLE-PUNCHED (8x10) / SQUARE (127 mm) / BUSINESS CARD (Card) / ENVELOPE (WESTERN-STYLE NO. 6) PORTRAIT / SQUARE (89 mm) / SQUARE (4x4) |
| 502 | PAPER TYPE | ENVELOPE / LABEL / PHOTO PAPER / PHOTO PAPER, GLOSSY STANDARD / PHOTO PAPER, SEMI-GLOSS / INKJET POSTCARD (MESSAGE SIDE) / INKJET POSTCARD (ADDRESS SIDE)/ INKJET PHOTO POSTCARD (MESSAGE SIDE) / INKJET PHOTO POSTCARD (ADDRESS SIDE) |
| 503 | NUMBER OF COPIES | Max = 99 |
| | PAPER ORIENTATION | VERTICAL/HORIZONTAL |
| | PRINT QUALITY | STANDARD/DRAFT |
| | PRINT BY COPIES | ON/OFF |
| | STAPLE | NONE / AUTOMATIC / TOP LEFT / BOTTOM LEFT / TOP RIGHT / BOTTOM RIGHT / LEFT SIDE(TWO POINT STAPLING) / TOP SIDE(TWO POINT STAPLING) / RIGHT SIDE (TWO POINT STAPLING) / BOTTOM SIDE(TWO POINT STAPLING) / SADDLE STITCHING / STAPLE-LESS BINDING |
| | PUNCH | NONE / PUNCH HOLE (AUTOMATIC) / PUNCH HOLE (TWO HOLES LEFT) / PUNCH HOLE (THREE HOLES LEFT) / PUNCH HOLE (FOUR HOLES LEFT) / PUNCH HOLE (MULTIPLE LEFT) / PUNCH HOLE (TWO HOLES RIGHT) / PUNCH HOLE (THREE HOLES RIGHT) / PUNCH HOLE (FOUR HOLES RIGHT) / PUNCH HOLE (MULTIPLE RIGHT) / PUNCH HOLE (TWO HOLES TOP) / PUNCH HOLE (THREE HOLES TOP) / PUNCH HOLE (FOUR HOLES TOP)/ PUNCH HOLE (MULTIPLE TOP) / PUNCH HOLE (TWO HOLES BOTTOM) / PUNCH HOLE (THREE HOLES BOTTOM) / PUNCH HOLE (FOUR HOLES BOTTOM) / PUNCH HOLE (MULTIPLE BOTTOM) |
| | FOLDING SETTING | NONE / TWO FOLD / C FOLD / FOUR FOLD / Z FOLD / SADDLE FOLD (OUTPUT FROM SADDLE FINISHER) |
| 504 | COLOR MODE | COLOR / MONOCHROME |
| | PAGE AGGREGATION | OFF / 2 in 1 / 4 in 1 / 6 in 1 / 9 in 1 / 16 in 1 |
| | PAGE LAYOUT | LEFT TO RIGHT / RIGHT TO LEFT |
| | SCALING | NONE / FIT-TO-PAGE-WIDTH / FIT-TO-SCREEN-SIZE |
| | DOUBLE-SIDED PRINTING | SINGLE-SIDED/DOUBLE-SIDED |
| | STAPLING SIDE | LONG-SIDE STAPLING / SHORT-SIDE STAPLING |
| | 180-DEGREE ROTATION | NONE / ROTATE LEFT / ROTATE RIGHT |
| | STORE JOB IN PRINTER | ON / OFF |
| | MIRROR PRINTING | ON / OFF |
| | SWITCH LANGUAGES | JAPANESE / English / French / German / Italian / Spanish / Portuguese / Dutch / Danish / Norwegian / Swedish / Finnish / Polish / Czech / Russian / Turkish / Chinese (Simplified) / Chinese (Traditional) / Korean / Thai / Indonesian |

FIG. 6A-1

```
<?xml version="1.0" encoding="utf-8"?>
<PrintDeviceCapabilities
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  xmlns="http://schemas.microsoft.com/windows/2013/12/printing/printschemaframework2"
  version="2">

   <psk:JobCopiesAllDocuments psf2:psftype="ParameterDef">
      <psf:DataType xsi:type="xsd:QName" psf2:psftype="Property">xsd:integer</psf:DataType>
      <psf:DefaultValue xsi:type="xsd:integer" psf2:psftype="Property">1</psf:DefaultValue>
      <psf:Mandatory xsi:type="xsd:QName" psf2:psftype="Property">psk:Unconditional</
psf:Mandatory>
      <psf:MaxValue xsi:type="xsd:integer" psf2:psftype="Property">999</psf:MaxValue>
      <psf:MinValue xsi:type="xsd:integer" psf2:psftype="Property">1</psf:MinValue>
      <psf:Multiple xsi:type="xsd:integer" psf2:psftype="Property">1</psf:Multiple>
      <psf:UnitType xsi:type="xsd:string" psf2:psftype="Property">copies</psf:UnitType>
   </psk:JobCopiesAllDocuments>

   <psk:PageMediaSize psf2:psftype="Feature">
      <psk:ISOA4 psf2:psftype="Option">
         <psk12:PortraitImageableSize xsi:type="psf2:ImageableAreaType"
psf2:psftype="Property">12700,12700,184600,271600</psk12:PortraitImageableSize>
         <psk:MediaSizeHeight xsi:type="xsd:integer" psf2:psftype="ScoredProperty">297000</
psk:MediaSizeHeight>
         <psk:MediaSizeWidth xsi:type="xsd:integer" psf2:psftype="ScoredProperty">210000</
psk:MediaSizeWidth>
601   </psk:ISOA4>
      <psk:NorthAmericaLetter psf2:psftype="Option" psf2:default="true">
         <psk12:PortraitImageableSize xsi:type="psf2:ImageableAreaType"
psf2:psftype="Property">12700,12700,190500,254000</psk12:PortraitImageableSize>
         <psk:MediaSizeHeight xsi:type="xsd:integer" psf2:psftype="ScoredProperty">279400</
psk:MediaSizeHeight>
         <psk:MediaSizeWidth xsi:type="xsd:integer" psf2:psftype="ScoredProperty">215900</
psk:MediaSizeWidth>
      </psk:NorthAmericaLetter>
   </psk:PageMediaSize>
```

FIG. 6A-2

```
  <psk:PageOrientation psf2:psftype="Feature">
    <psk:Landscape psf2:psftype="Option"/>
    <psk:Portrait psf2:psftype="Option" psf2:default="true"/>
  </psk:PageOrientation>

        .......................

  <psk:PageOutputColor psf2:psftype="Feature">
    <psk:Color psf2:psftype="Option" psf2:default="true">
      <psk:DeviceBitsPerPixel xsi:type="xsd:integer" psf2:psftype="ScoredProperty">24</
psk:DeviceBitsPerPixel>
      <psk:DriverBitsPerPixel xsi:type="xsd:integer" psf2:psftype="ScoredProperty">24</
psk:DriverBitsPerPixel>
    </psk:Color>
  </psk:PageOutputColor>
</PrintDeviceCapabilities>
```

FIG. 6B-1

```xml
<?xml version="1.0" encoding="UTF-8"?>
<PrintDeviceCapabilities
  xmlns:ns0000="http://schemas.microsoft.com/windows/2018/04/printing/printschemakeywords/ipp"
  xmlns:xsi="http://www.w3.org/2001/XMLSchema-instance"
  xmlns:xsd="http://www.w3.org/2001/XMLSchema"
  xmlns:xml="http://www.w3.org/XML/1998/namespace"
  xmlns:psk="http://schemas.microsoft.com/windows/2003/08/printing/printschemakeywords"
  xmlns:psk11="http://schemas.microsoft.com/windows/2013/05/printing/printschemakeywordsv11"
  xmlns:psk12="http://schemas.microsoft.com/windows/2013/12/printing/printschemakeywordsv12"
  xmlns:psf="http://schemas.microsoft.com/windows/2003/08/printing/printschemaframework"
  xmlns:psf2="http://schemas.microsoft.com/windows/2013/12/printing/printschemaframework2"
  xmlns="http://schemas.microsoft.com/windows/2013/12/printing/printschemaframework2"
  version="2">

  <!-- copies-default, copies-supported -->
  <psk:JobCopiesAllDocuments psf2:psftype="ParameterDef">
    <psf:DataType psf2:psftype="Property" xsi:type="xsd:QName">xsd:integer</psf:DataType>
    <psf:DefaultValue psf2:psftype="Property" xsi:type="xsd:integer">1</psf:DefaultValue>
    <psf:Mandatory psf2:psftype="Property" xsi:type="xsd:QName">psk:Unconditional</psf:Mandatory>
    <psf:MinValue psf2:psftype="Property" xsi:type="xsd:integer">1</psf:MinValue>
    <psf:MaxValue psf2:psftype="Property" xsi:type="xsd:integer">99</psf:MaxValue>
    <psf:Multiple psf2:psftype="Property" xsi:type="xsd:integer">1</psf:Multiple>
    <psf:UnitType psf2:psftype="Property" xsi:type="xsd:string">copies</psf:UnitType>
  </psk:JobCopiesAllDocuments>
```

```
<!-- media-default, media-supported, media-col-database -->
<psk:PageMediaSize psf2:psftype="Feature">
  <psk:JapanHagakiPostcard psf2:psftype="Option" psf2:default="false">
    <psk:MediaSizeWidth xsi:type="xsd:integer" psf2:psftype="ScoredProperty">100000</psk:MediaSizeWidth>
    <psk:MediaSizeHeight xsi:type="xsd:integer" psf2:psftype="ScoredProperty">148000</psk:MediaSizeHeight>
    <psk12:PortraitImageableSize xsi:type="psf2:ImageableAreaType" psf2:psftype="Property">3400,5000,93200,138000</psk12:PortraitImageableSize>
    <psk12:BorderlessImageableSize xsi:type="psf2:ImageableAreaType" psf2:psftype="Property">0,0,100000,148000</psk12:BorderlessImageableSize>
  </psk:JapanHagakiPostcard>
  <psk:ISOA5 psf2:psftype="Option" psf2:default="false">
    <psk:MediaSizeWidth xsi:type="xsd:integer" psf2:psftype="ScoredProperty">148000</psk:MediaSizeWidth>
    <psk:MediaSizeHeight xsi:type="xsd:integer" psf2:psftype="ScoredProperty">210000</psk:MediaSizeHeight>
    <psk12:PortraitImageableSize xsi:type="psf2:ImageableAreaType" psf2:psftype="Property">3400,5000,141200,200000</psk12:PortraitImageableSize>
    <psk12:BorderlessImageableSize xsi:type="psf2:ImageableAreaType" psf2:psftype="Property">0,0,148000,210000</psk12:BorderlessImageableSize>
  </psk:ISOA5>
  <psk:ISOA4 psf2:psftype="Option" psf2:default="false">
    <psk:MediaSizeWidth xsi:type="xsd:integer" psf2:psftype="ScoredProperty">210000</psk:MediaSizeWidth>
    <psk:MediaSizeHeight xsi:type="xsd:integer" psf2:psftype="ScoredProperty">297000</psk:MediaSizeHeight>
    <psk12:PortraitImageableSize xsi:type="psf2:ImageableAreaType" psf2:psftype="Property">3400,5000,203200,287000</psk12:PortraitImageableSize>
    <psk12:BorderlessImageableSize xsi:type="psf2:ImageableAreaType" psf2:psftype="Property">0,0,210000,297000</psk12:BorderlessImageableSize>
  </psk:ISOA4>
  <psk:NorthAmericaLetter psf2:psftype="Option" psf2:default="true">
    <psk:MediaSizeWidth xsi:type="xsd:integer" psf2:psftype="ScoredProperty">215900</psk:MediaSizeWidth>
    <psk:MediaSizeHeight xsi:type="xsd:integer" psf2:psftype="ScoredProperty">279400</psk:MediaSizeHeight>
    <psk12:PortraitImageableSize xsi:type="psf2:ImageableAreaType" psf2:psftype="Property">6400,5000,203200,269400</psk12:PortraitImageableSize>
    <psk12:BorderlessImageableSize xsi:type="psf2:ImageableAreaType" psf2:psftype="Property">0,0,215900,279400</psk12:BorderlessImageableSize>
  </psk:NorthAmericaLetter>
  <psk:JapanYou4Envelope psf2:psftype="Option" psf2:default="false">
    <psk:MediaSizeWidth xsi:type="xsd:integer" psf2:psftype="ScoredProperty">105000</psk:MediaSizeWidth>
    <psk:MediaSizeHeight xsi:type="xsd:integer" psf2:psftype="ScoredProperty">235000</psk:MediaSizeHeight>
    <psk12:PortraitImageableSize xsi:type="psf2:ImageableAreaType" psf2:psftype="Property">5600,8000,93800,214300</psk12:PortraitImageableSize>
    <psk12:BorderlessImageableSize xsi:type="psf2:ImageableAreaType" psf2:psftype="Property">0,0,105000,235000</psk12:BorderlessImageableSize>
  </psk:JapanYou4Envelope>
```

```
    <psk:NorthAmericaLegal psf2:psftype="Option" psf2:default="false">
      <psk:MediaSizeWidth xsi:type="xsd:integer" psf2:psftype="ScoredProperty">215900</psk:MediaSizeWidth>
      <psk:MediaSizeHeight xsi:type="xsd:integer" psf2:psftype="ScoredProperty">355600</psk:MediaSizeHeight>
      <psk12:PortraitImageableSize xsi:type="psf2:ImageableAreaType" psf2:psftype="Property">6400,5000,203200,345600</psk12:PortraitImageableSize>
      <psk12:BorderlessImageableSize xsi:type="psf2:ImageableAreaType" psf2:psftype="Property">0,0,215900,355600</psk12:BorderlessImageableSize>
    </psk:NorthAmericaLegal>
    <psk:JISB5 psf2:psftype="Option" psf2:default="false">
      <psk:MediaSizeWidth xsi:type="xsd:integer" psf2:psftype="ScoredProperty">182000</psk:MediaSizeWidth>
      <psk:MediaSizeHeight xsi:type="xsd:integer" psf2:psftype="ScoredProperty">257000</psk:MediaSizeHeight>
      <psk12:PortraitImageableSize xsi:type="psf2:ImageableAreaType" psf2:psftype="Property">3400,5000,175200,247000</psk12:PortraitImageableSize>
      <psk12:BorderlessImageableSize xsi:type="psf2:ImageableAreaType" psf2:psftype="Property">0,0,182000,257000</psk12:BorderlessImageableSize>
    </psk:JISB5>
  </psk:PageMediaSize>

  <!-- orientation-requested-default -->
  <psk:PageOrientation psf2:psftype="Feature">
    <psk:Portrait psf2:psftype="Option" psf2:default="true"/>
    <psk:Landscape psf2:psftype="Option" psf2:default="false"/>
    <psk:ReverseLandscape psf2:psftype="Option" psf2:default="false"/>
  </psk:PageOrientation>

      ......................
```

```
  <!-- finishings-default, finishings-supported -->
  <psk:JobStapleAllDocuments psf2:psftype="Feature">
    <psk:None psf2:psftype="Option" psf2:default="true"/>
    <psk:StapleTopLeft psf2:psftype="Option" psf2:default="false"/>
    <psk:StapleTopRight psf2:psftype="Option" psf2:default="false"/>
    <psk:StapleBottomLeft psf2:psftype="Option" psf2:default="false"/>
    <psk:StapleBottomRight psf2:psftype="Option" psf2:default="false"/>
    <psk:StapleDualLeft psf2:psftype="Option" psf2:default="false"/>
    <psk:StapleDualTop psf2:psftype="Option" psf2:default="false"/>
    <psk:StapleDualRight psf2:psftype="Option" psf2:default="false"/>
    <psk:StapleDualBottom psf2:psftype="Option" psf2:default="false"/>
    <psk:SaddleStitch psf2:psftype="Option" psf2:default="false"/>
  </psk:JobStapleAllDocuments>

  <!-- sides-default, sides-supported -->
  <psk:JobDuplexAllDocumentsContiguously psf2:psftype="Feature">
    <psk:OneSided psf2:psftype="Option" psf2:default="true"/>
    <psk:TwoSidedShortEdge psf2:psftype="Option" psf2:default="false"/>
    <psk:TwoSidedLongEdge psf2:psftype="Option" psf2:default="false"/>
  </psk:JobDuplexAllDocumentsContiguously>

  <!-- print-color-mode-default, print-color-mode-supported, pwg-raster-document-type-supported -->
  <psk:PageOutputColor psf2:psftype="Feature">
    <psk:Color psf2:psftype="Option" psf2:default="true"/>
    <psk:Grayscale psf2:psftype="Option" psf2:default="false"/>
    <psk:Monochrome psf2:psftype="Option" psf2:default="false"/>
  </psk:PageOutputColor>
</PrintDeviceCapabilities>
```

```
[Version]
Signature = "$WINDOWS NT$"
Class = Extension
ClassGuid = {e2f84ce7-8efa-411c-aa69-97454ca4cb57}
Provider = %ManufacturerName%
ExtensionId = {D4D9196A-105B-4B76-B693-84BD33A7A703}
CatalogFile = App.cat
DriverVer = 08/19/2020,16.35.13.542

[Manufacturer]
%ManufacturerName% = Microsoft, NTamd64.6.3

[Microsoft.NTamd64.6.3]
%Device.ExtensionDesc% = App-Install, %PrinterHardwareId%
%Device.ExtensionDesc% = App-Install, %PrinterHardwareId2%
%Device.ExtensionDesc% = App-Install, %PrinterHardwareId3%

[App-Install.NT]
AddProperty = Add-App-Property

[App-Install.NT.Software]
AddSoftware = %SoftwareName%,, Microsoft-App-SoftwareInstall

[Microsoft-App-SoftwareInstall]
SoftwareType = %MicrosoftStoreType%
SoftwareID = pfn://%PackageFamilyName%

[Add-App-Property]
{A925764B-88E0-426D-AFC5-B39768BE59EB}, 1, 0x12,, %AUMID%

[Strings]
ManufacturerName = "Microsoft"
SoftwareName = "ABCPrintApp"
PackageFamilyName = "PrinterApp_aaaaaaaaaaa8a"
AUMID = "PrinterApp_aaaaaaaaaaa8a!App"
Device.ExtensionDesc = "PrintApp"
MicrosoftStoreType = 2
PrinterHardwareId = "PrinterApp_AAAA_BBBB"
```

F I G. 8
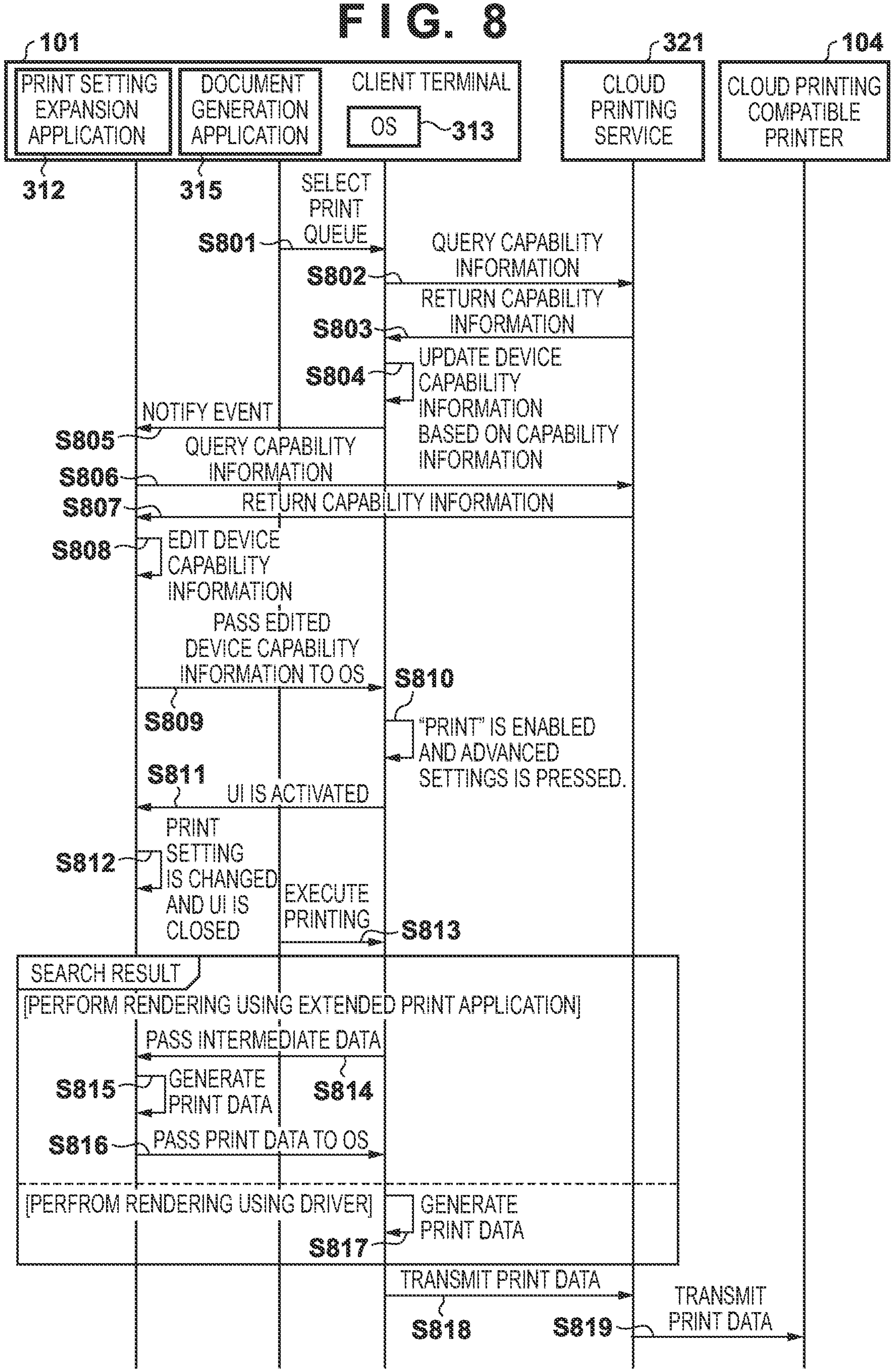

FIG. 13A

```
<FixedPage xmlns=“http://schemas.microsoft.com/xps/2005/06” Width=“794”
Height=“1123” xml:lang=“ja-JP”>
 <Canvas
 Clip=“M 0.000008871,0.000012546 L 595.32,0.000012546 L 595.32,841.92 L
0.000008871,841.92 L 0.000008871,0.000012546 Z ”>
  <Glyphs Name=“a0” BidiLevel=“0” Fill=“#FF000000”
  FontUri=“/Resources/40643CE3-20A2-4A18-D40F-33568C62956C.odttf”
  FontRenderingEmSize=“10.56” StyleSimulations=“None” OriginX=“85.104”
  OriginY=“111.98” UnicodeString=“ ” Indices=“” xml:lang=“en-US”>
  </Glyphs>
 </Canvas>
 <Path
 Data=“M 108.75,122.79 L 130.18,122.79 L 130.18,113.25 L 149.25,132.33 L
130.18,151.4 L 130.18,141.86 L 108.75,141.86 Z ”
 Stroke=“#FF000000” StrokeThickness=“1” StrokeMiterLimit=“8”>
 </Path>
</FixedPage>
```

FIG. 13B 1301 (lines marked + below); 1302 (MatrixTransform line)

```
<FixedPage xmlns=“http://schemas.microsoft.com/xps/2005/06” Width=“794”
Height=“1123” xml:lang=“ja-JP”>
+  <Canvas>
+  <Canvas.RenderTransform>
+    <MatrixTransform Matrix=“-1,0,0,1,0,0”/>
+  </Canvas.RenderTransform>
 <Canvas
 Clip=“M 0.000008871,0.000012546 L 595.32,0.000012546 L 595.32,841.92 L
0.000008871,841.92 L 0.000008871,0.000012546 Z ”>
  <Glyphs Name=“a0” BidiLevel=“0” Fill=“#FF000000”
  FontUri=“/Resources/40643CE3-20A2-4A18-D40F-33568C62956C.odttf”
  FontRenderingEmSize=“10.56” StyleSimulations=“None” OriginX=“85.104”
  OriginY=“111.98” UnicodeString=“ ” Indices=“” xml:lang=“en-US”>
  </Glyphs>
 </Canvas>
 <Path
 Data=“M 108.75,122.79 L 130.18,122.79 L 130.18,113.25 L 149.25,132.33 L
130.18,151.4 L 130.18,141.86 L 108.75,141.86 Z ”
 Stroke=“#FF000000” StrokeThickness=“1” StrokeMiterLimit=“8”>
 </Path>
+  </Canvas>
</FixedPage>
```

FIG. 16A

```
2 0 obj
<</Type/Pages
        /Kids[ 4 0 R
               10 0 R
               24 0 R
              ]
        /Count 3
 >>
endobj

4 0 obj
<< /Type  /Page
    ...
>>
endobj

10 0 obj
<< /Type  /Page
    ...
>>
endobj

24 0 obj
<< /Type  /Page
    ...
>>
endobj
```

FIG. 16B

```
2 0 obj
<</Type/Pages
        /Kids[ 4 0 R
               10 0 R
               24 0 R
              ]
        /Count 3
 >>
+stream
+  -1 0 0 1 0 0 cm
+endstream
endobj

4 0 obj
<< /Type  /Page
    ...
>>
endobj

10 0 obj
<< /Type  /Page
    ...
>>
endobj

24 0 obj
<< /Type  /Page
    ...
>>
endobj
```

INFORMATION PROCESSING APPARATUS AND METHOD OF CONTROLLING THE SAME, AND STORAGE MEDIUM STORING PRINT EXPANSION PROGRAM

BACKGROUND

Field

The present disclosure relates to an information processing apparatus, a method of controlling the same, and a storage medium storing a print expansion program.

Description of the Related Art

Recently, general-purpose printer drivers (local printer drivers) that communicate directly with image forming apparatuses using industry-standard protocols such as Internet Printing Protocol (IPP) have been developed. A local printer driver can communicate with printers from a plurality of printer vendors. Therefore, by using a local printer driver, a user can cause an information processing apparatus, such as a PC, to transmit a print job to an image forming apparatus and print the print job without installing a vendor-specific printer driver in the information processing apparatus.

In addition, printing that uses cloud printing services has become more popular. In a cloud printing service, a printer driver (cloud printer driver) for the cloud printing service is installed on an information processing apparatus. In the cloud printing service, the information processing apparatus transmits a print job to the cloud printing service using the cloud printer driver, and the cloud printing service transmits the print job to an image forming apparatus, to thereby execute printing.

Since the aforementioned local printer drivers and cloud printer drivers handle print jobs to be printed by image forming apparatuses of various vendors, there are restrictions on functions and items that can be set as print settings. Therefore, in Japanese Patent Laid-Open No. 2020-087255, it is determined whether a vendor-specific printer driver is installed on a client terminal so that a print setting expansion application can select optional functions of the vendor-specific printer driver. If the printer driver is not present, by installing the printer driver in the operating system, the print setting expansion application can generate print data in which the optional functions are reflected.

However, even for data that can be generated on the client terminal side, some of the aforementioned conventional optional functions, such as "mirror printing", require installation of a vendor-specific printer driver. Therefore, there is a problem that it takes effort on the user side to use such a function.

SUMMARY

Embodiments of the present disclosure eliminate the above-mentioned issues with conventional technologies.

A feature of embodiments of the present disclosure is to provide a technique that eliminates the need to install a vendor-specific printer driver for printing that uses a predetermined function, such as mirror printing, and allows printing using such a function.

According to embodiments of the present disclosure, there is provided a non-transitory computer-readable storage medium storing an application program for causing a processor to execute a method for expanding a function of a printing software included in advance in an operating system (OS), the method comprising: obtaining capability information of a target printing apparatus in a case where an event is notified from the OS, editing, based on the obtained capability information, device capability information stored in the OS, displaying a print setting screen based on the edited device capability information, receiving intermediate data including a print setting set via the print setting screen from the OS and determining whether the intermediate data includes a predetermined function, the predetermined function is related to image inversion and not supported by the OS, and in a case where it is determined that the intermediate data includes the predetermined function, editing the intermediate data such that the predetermined function is realized.

According to embodiments of the present disclosure, there is provided an information processing apparatus in which an application program is installed on an operating system (OS) configured to obtain printer capability information from a target printing apparatus, the information processing apparatus includes one or more controllers including one or more processors and one or more memories, the one or more controllers that execute the application program configured to obtain additional capability information from the target printing apparatus in a case where an event is notified from the OS, edit device capability information stored in the OS based on the obtained capability information, display a print setting screen based on the edited device capability information, determine whether intermediate data including a print setting set via the print setting screen includes a predetermined function, the predetermined function is related to image inversion and not supported by the OS, edit the intermediate data such that the predetermined function is realized in a case where it is determined that the intermediate data includes the predetermined function, and generate print data based on the edited intermediate data.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 5 is a diagram illustrating an example of capability information of the printer in the embodiment.

FIGS. 6A-1 and 6A-2 are diagrams illustrating an example of device capability information bundled with the OS.

FIGS. 6B-1 to 6B-3 are diagrams illustrating an example of device capability information updated using capability information obtained from the cloud printing service.

FIG. 6C is a diagram illustrating an example of device capability information updated using capability information obtained from the cloud printing service.

FIG. 7 is a diagram illustrating an example of an enhanced setup information file according to the embodiment.

FIG. 8 is a diagram illustrating an example of a sequence for explaining processing from performing print settings for the cloud printing compatible printer up to transmission of print data in the embodiment.

FIGS. 13A and 13B are diagrams illustrating an example of XPS data edited in the processing of FIG. 12.

FIGS. 16A and 16B are diagrams illustrating an example of editing of a PDF according to a modification of the embodiment.

DESCRIPTION OF THE EMBODIMENTS

Figure 1:
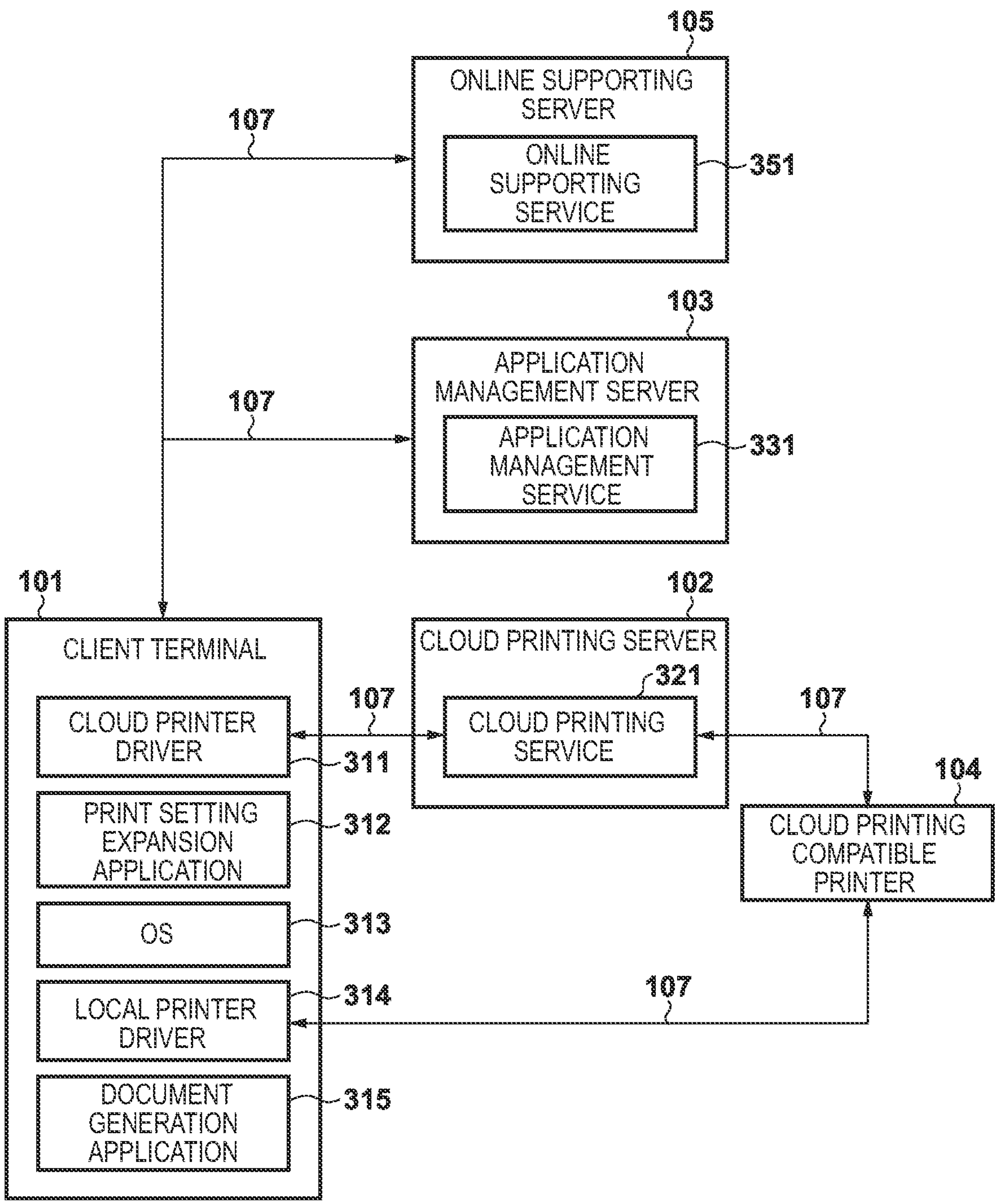
FIG. 1 is a diagram for explaining a configuration of a printing system for executing cloud printing according to an embodiment.

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure. Further, in the accompanying drawings, the same or similar configurations are assigned the same reference numerals, and redundant descriptions are omitted.

FIG. 1 is a diagram for describing a configuration of a printing system for executing cloud printing according to an embodiment.

In the printing system, a client terminal 101, a cloud printing server 102, an application management server 103, a cloud printing compatible printer 104, and an online supporting server 105 are connected via a network 107. FIG. 1 illustrates one client terminal 101 and one cloud printing compatible printer 104, but there may be a plurality of client terminals 101 and cloud printing compatible printers 104.

The cloud printing server 102, the application management server 103, and the online supporting server 105 may each be a server system configured by a plurality of information processing apparatuses. By thus configuring a server system in which each server is constituted by a plurality of information processing apparatuses, it is possible to distribute the load among the plurality of information processing apparatuses.

The cloud printing server 102, the application management server 103, and the online supporting server 105 may be virtually configured in one physical information processing apparatus. Regarding the network 107, a WAN, such as the Internet, is assumed for connection to the cloud service, but a closed environment, such as a completely in-house LAN, may be employed.

The client terminal 101 is an information processing apparatus such as a PC, a tablet, or a smartphone, and is an information terminal that is directly operated by a user. Any application software can be executed on the client terminal 101. The client terminal 101 includes a cloud printer driver 311, an operating system (OS) 313, a local printer driver 314, a document generation application 315 and a print setting expansion application (print expansion program) 312 to be described later. The print setting expansion application 312 is received from the application management server 103 and installed as will be described later.

The cloud printing compatible printer 104 is a device that actually performs printing on a print medium, such as paper, and is an image forming apparatus that converts print data received through the network 107 into image data and prints the print data. The cloud printing compatible printer 104 can receive print data from the client terminal 101 via the cloud printing server 102 or directly from the client terminal 101 without using the cloud printing server 102. The cloud printing compatible printer 104 receives print data generated by the cloud printer driver 311 of the client terminal 101 through the cloud printing server 102. The cloud printing compatible printer 104 receives print data generated by the local printer driver 314 of the client terminal 101 without going through the cloud printing server 102.

The cloud printing server 102 accepts print instructions and print data from the outside. The cloud printing server 102 transmits the received print data to a predetermined cloud printing compatible printer 104.

The application management server 103 stores and manages various applications. The application management server 103 receives the identification information of an application and a download request from the client terminal 101 and transmits an application identified based on the received identification information to the client terminal 101.

The online supporting server 105 is a server apparatus that provides an online supporting service 351. The online supporting service 351 is a server apparatus for providing the client terminal 101 with a file describing information for expanding the functions of the client terminal 101.

Next, a hardware configuration of the client terminal 101, the servers 102, 103, 105, and the cloud printing compatible printer 104 included in the printing system according to the embodiment will be described with reference to FIGS. 2A to 2E.

Figure 2A:
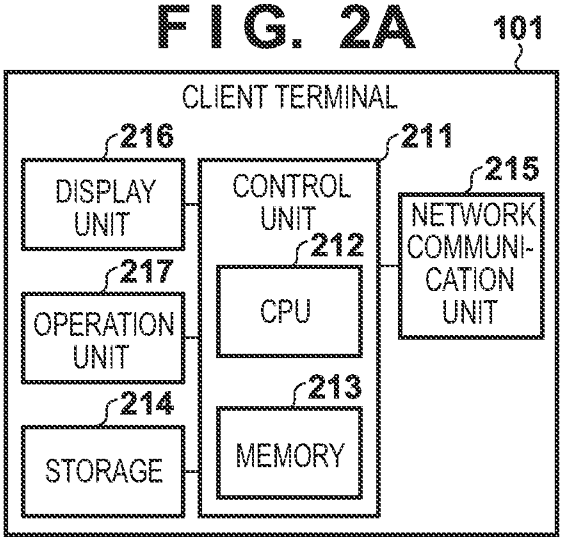
FIGS. 2A to 2E are block diagrams for explaining a hardware configuration of a client terminal, a server, and a cloud printing compatible printer included in the printing system according to the embodiment.

FIG. 2A is a block diagram for explaining a hardware configuration of the client terminal 101 according to the embodiment.

The client terminal 101 includes a display unit 216, an operation unit 217, a storage 214, a control unit 211, and a network communication unit 215. The storage 214 corresponds to a non-volatile storage apparatus, such as a hard disk or an SSD, and can store and rewrite digital data. The control unit 211 includes a CPU 212 and a memory 213 and controls the overall operation of the client terminal 101. The CPU 212 deploys a program stored in the storage 214 in the memory 213 and executes the program. The memory 213 is a main storage memory of the CPU 212 and is used as a work area as well as a temporary storage region for deploying various programs. The network communication unit 215 communicates with the external network 107 and inputs and outputs digital data to and from an external server, a client terminal, and the like via the network 107. The display unit 216 is, for example, a liquid crystal display, and displays visual information to the user. The operation unit 217 accepts inputs from the user through a keyboard, a pointing device, and the like. An apparatus, such as a touch panel, provided with functions of both the display unit 216 and the operation unit 217 may be used.

Figure 2B:
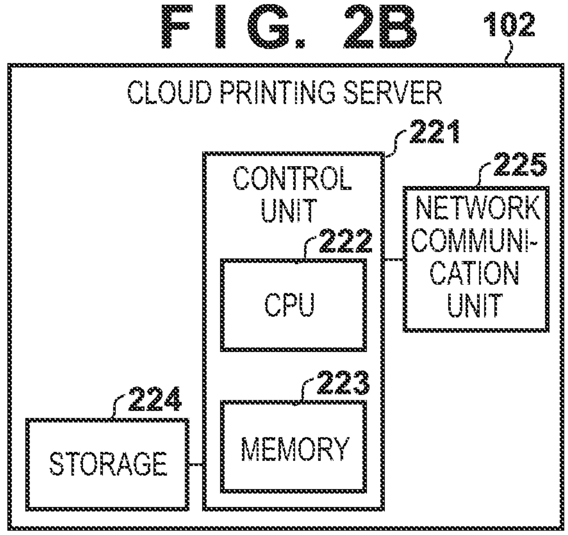

FIG. 2B is a block diagram for explaining a hardware configuration of the cloud printing server 102 according to the embodiment.

The cloud printing server 102 includes a storage 224, a control unit 221, and a network communication unit 225. The control unit 221 includes a CPU 222 and a memory 223. The descriptions of the storage 224, the control unit 221, and the network communication unit 225 are basically equivalent to that of corresponding portions of the client terminal 101 and thus will be omitted. Although the cloud printing server 102 is described as being configured by a single information processing apparatus having the hardware configuration illustrated in FIG. 2B, the cloud printing server 102 may be constituted by a plurality of information processing apparatuses.

Figure 2C:
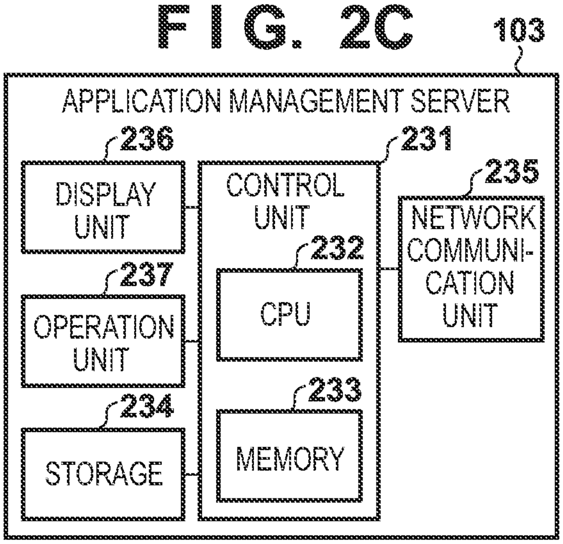

FIG. 2C is a block diagram for explaining a hardware configuration of the application management server 103 according to the embodiment.

The application management server 103 includes a display unit 236, an operation unit 237, a storage 234, a control unit 231, and a network communication unit 235. The control unit 231 includes a CPU 232 and a memory 233. The description of the display unit 236, the operation unit 237, the storage 234, the control unit 231, and the network communication unit 235 are basically equivalent to that of corresponding portions of the client terminal 101 and thus will be omitted. Although the application management server 103 is described as being constituted by a single information processing apparatus having the hardware configuration illustrated in FIG. 2C, the application management server 103 may be configured by a plurality of information processing apparatuses.

Figure 2D:
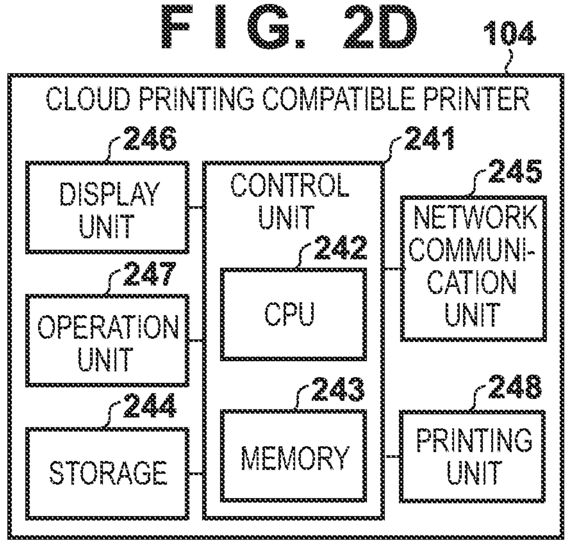

FIG. 2D is a block diagram for explaining a hardware configuration of the cloud printing compatible printer 104 according to the embodiment.

The cloud printing compatible printer 104 includes a display unit 246, an operation unit 247, a storage 244, a control unit 241, a network communication unit 245, and a printing unit 248. The display unit 246 is a touch panel, an LED, and the like provided in the cloud printing compatible printer 104 and displays information to the user. The operation unit 247 accepts inputs from the user and may include physical keys, such as a numeric keypad, in addition to the touch panel. The control unit 241 includes a CPU 242 and a memory 243. The storage 244 and the control unit 241 are basically equivalent to corresponding parts of the client terminal 101, and thus, description thereof will be omitted. The network communication unit 245 communicates with the external network 107. The network communication unit 245 mainly serves to receive print data and transmit the state of the cloud printing compatible printer 104, such as an error, to an external server or the like.

The printing unit 248 performs print processing by performing a series of operations of feeding, printing, and discharging paper (sheets) provided in a cassette or a tray. The printing method here is an electrophotographic method, an ink jet method, or the like and is not particularly limited. A double-sided unit used during discharging and a finishing apparatus for stapling, punching processing, and the like are also included in the printing unit 248.

Although in the embodiment a single-function printer that performs only a printing function is described as an example of the cloud printing compatible printer 104, a multi-function printer (multi-function peripheral) that also includes a scanner function and a fax function may be used.

Figure 2E:
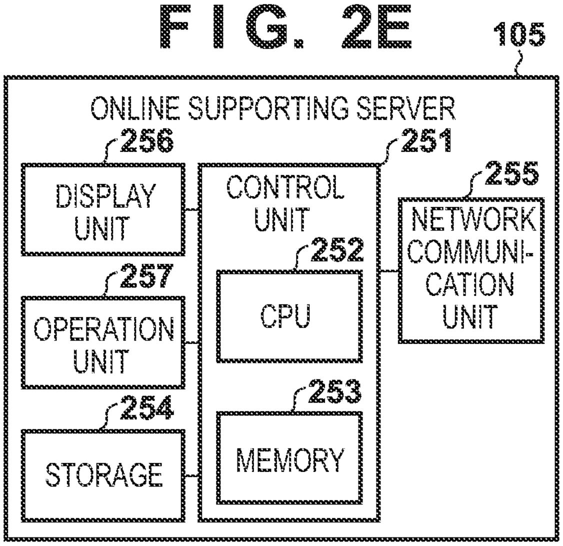

FIG. 2E is a block diagram for explaining a hardware configuration of the online supporting server 105 according to the embodiment. In the embodiment, the online supporting server 105 is described as being constituted by one information processing apparatus but may be constituted by a plurality of information processing apparatuses.

The online supporting server 105 includes a display unit 256, an operation unit 257, a storage 254, a control unit 251, and a network communication unit 255. The functions of the display unit 256 and the operation unit 257 are similar to those of the display unit 216 and the operation unit 217 of the client terminal 101, and thus, description thereof will be omitted. The storage 254 is a memory device, such as a Hard Disk Drive (HDD) or a Solid State Drive (SSD). The storage 254 stores an enhanced setup information file, which is a file describing information for expanding the functions provided by the client terminal 101.

The control unit 251 includes a CPU 252 and a memory 253. The CPU 252 controls the entire online supporting server 105. The memory 253 is used for processing performed by the CPU 252. The network communication unit 255 is an interface for the online supporting server 105 to communicate with the client terminal 101. Upon receiving a request for obtaining a file stored in the storage 254 from the client terminal 101 through the network communication unit 255, the online supporting server 105 transmits a corresponding file to the client terminal 101.

Next, an example of a procedure by a user and a sequence between respective pieces of software and the printing service in the embodiment will be described with reference to FIG. 3.

Figure 3:
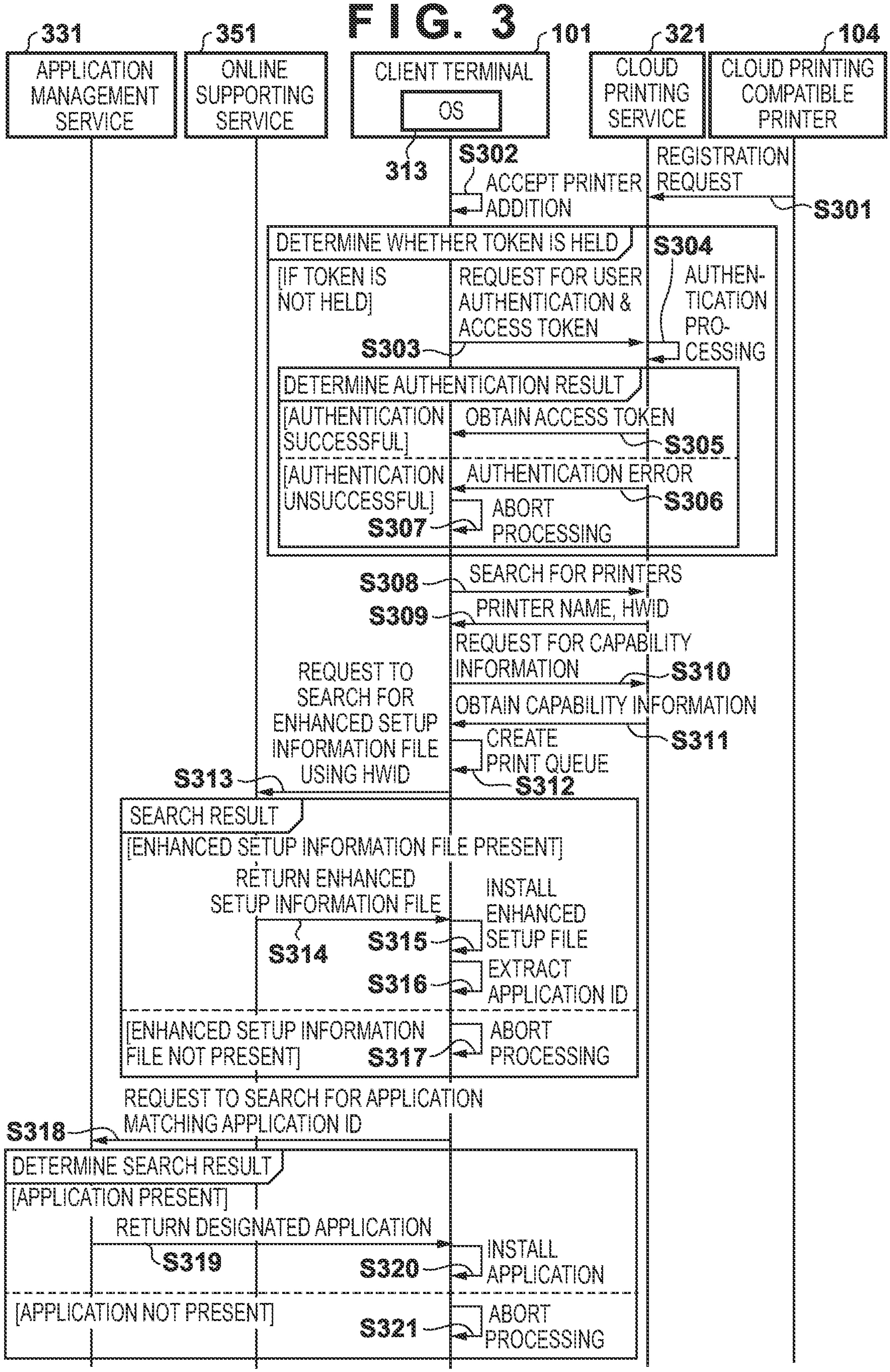
FIG. 3 is a diagram for explaining an example of a sequence in which the client terminal installs a print setting expansion application for the cloud printing compatible printer from an online supporting server in the printing system according to a first embodiment.

FIG. 3 is a diagram for explaining an example of a sequence in which the client terminal 101 installs the print setting expansion application 312 for the cloud printing compatible printer 104 from the online supporting server 105 in the printing system according to the embodiment.

First, the cloud printing compatible printer 104 accepts a printer registration operation for registering the cloud printing compatible printer 104 in a cloud printing service 321 from the user. Thus, in step S301, the cloud printing compatible printer 104 transmits a printer registration request to the cloud printing service 321 along with the device identification information of the printer 104. Here, the device identification information transmitted to the cloud printing service 321 is, for example, a hardware ID (HWID) allocated for a respective model of printer. The device identification information may be any piece of information by which the model of printer can be identified.

Upon receiving the registration request, the cloud printing service 321 transmits a Uniform Resource Locator (URL) of the cloud printing service 321 for printer registration to the cloud printing compatible printer 104. When the user accesses the URL from the cloud printing compatible printer 104 or an information processing apparatus, an input screen for inputting a user ID and a password is displayed on the display unit of the terminal that accessed the URL. Then, the user inputs, via the input screen, a user ID and a password for utilizing the cloud printing service 321 and logs in to the cloud printing service 321. When the user thus logs in successfully, the cloud printing service 321 transmits a request for obtaining information necessary for registering the printer to the cloud printing compatible printer 104. Accordingly, in response to the request, the cloud printing compatible printer 104 transmits printer information to the cloud printing service 321.

Upon thus receiving the printer registration request, the cloud printing service 321 registers the information of the cloud printing compatible printer 104 and generates a print queue for the cloud printing compatible printer 104. At this time, the cloud printing service 321 obtains the capability information of the cloud printing compatible printer 104 and associates the capability information with the generated print queue. Here, the capability information is information representing the functions provided in the printer 104 and refers to information necessary for the user to perform settings as print setting at the time of printing using the printer 104, such as double-sided printing capability information, color printing capability information, and stapling capability information.

As a concrete example, assume that IPP is used as a communication protocol. The cloud printing service 321 queries the cloud printing compatible printer 104 for the capability information of the printer, as illustrated in FIG. 5, for example.

FIG. 5 is a diagram illustrating an example of the capability information of the printer in the embodiment.

Here, the capability information includes capability information related to print settings, such as a paper size 501, a paper type 502, a number of copies 503, and a color mode 504. Specifically, regarding requested-attributes, information related to minimum, maximum, and default values for the number of copies (copies-default and copies-supported) and media-type-supported and media-source-supported, which are related to paper sizes and paper types, and print-color-mode-default and print-color-mode-supported, which are related to color modes, are queried. These queried attributes are determined by the cloud printing service 321.

The cloud printing compatible printer 104 responds to the aforementioned query with candidates for settings that it is capable of and default information. For example, in the case of the number of copies, "1" is returned as a default value in response to a copies-default query. In addition, minimum and maximum values, such as "1, 9999", is returned in response to copies-supported. In addition, for example, "color" is returned as a default value in response to a print-color-mode-default query, and options, "color", "monochrome", and "auto", are returned in response to print-color-mode-supported. Furthermore, in the obtainment of the capability information, information indicating whether the printing apparatus supports mirror printing can also be obtained. These pieces of information related to the cloud printing compatible printer 104 are stored in the cloud printing service 321. With the above processing, preparation to perform printing on the cloud printing compatible printer 104 using the cloud printing service 321 is completed.

Next, installation of the print setting expansion application 312 to be performed when the user performs on the client terminal 101 a setup operation for performing printing on the cloud printing compatible printer 104 will be described.

An OS 313 of the client terminal 101 accepts a cloud printing compatible printer setup operation by the user. A cloud printing compatible printer setup operation is, for example, the following operation. In step S302, the OS 313 of the client terminal 101 accepts an add printer instruction from the user.

Figure 4:
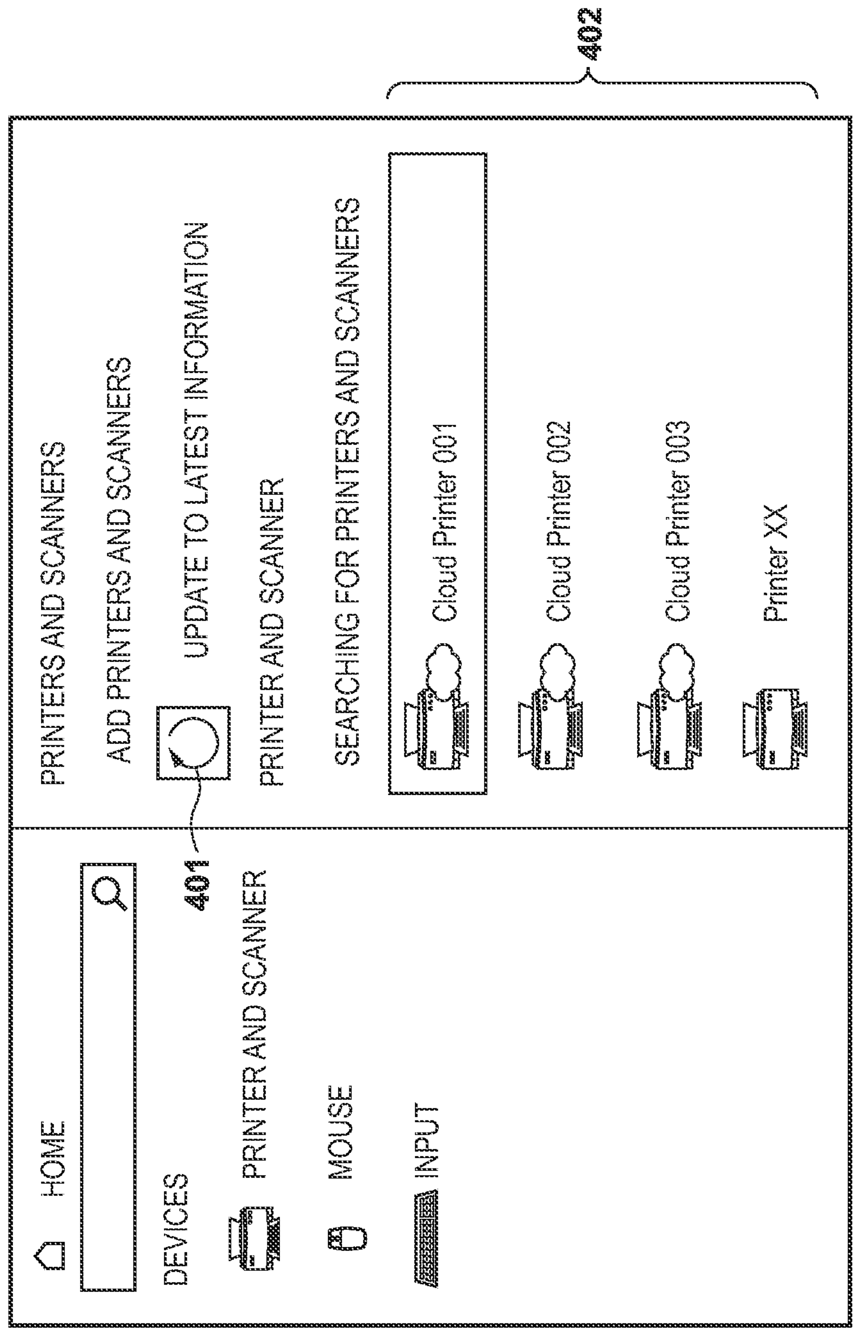
FIG. 4 depicts a view illustrating an example of a screen related to printers registered in the client terminal that is displayed by an OS of the client terminal according to the embodiment.

FIG. 4 depicts a view illustrating an example of a screen related to printers registered in the client terminal 101 that is displayed by the OS 313 of the client terminal 101 according to the embodiment.

In step S302, the add printer instruction is inputted to the OS 313 by the user selecting a button 401. Upon accepting the add printer instruction, the OS 313 determines whether it holds a token for the cloud printing service 321. Here, if it does not hold the token, the OS 313 displays a screen for inputting user information (login name and password). In step S303, the user information inputted through the screen is transmitted to the cloud printing service 321 and user authentication and an access token are requested.

Thus, in step S304, the cloud printing service 321 performs authentication processing using the user information received from the client terminal 101. Upon completing the authentication processing, the cloud printing service 321 notifies the client terminal 101 of the result of the authentication processing. Here, if user authentication is successful, the OS 313 obtains the access token from the cloud printing service 321 in step S305. Meanwhile, if user authentication fails in step S304, the cloud printing service 321 notifies the OS 313 of the client terminal 101 of an authentication error in step S306. In this case, in step S307, the OS 313 of the client terminal 101 aborts the processing based on the received authentication error information, and the OS 313 ends the processing described in FIG. 3.

If the OS 313 already holds the access token or obtains the access token in step S305, the OS 313 of the client terminal 101 advances the processing to step S308. In step S308, the OS 313 searches for printers registered in the cloud printing service 321 and printers connected to the network 107. At this time, the OS 313 of the client terminal 101 transmits a request for obtaining information of printers registered in the cloud printing service 321. Specifically, the OS 313 transmits a request for obtaining information of printers with the access token attached to the cloud printing service 321.

As a result, in step S309, the cloud printing service 321 identifies a tenant ID to which the user identified by the access token attached to the obtainment request belongs and prepares a list of printers associated with the tenant ID to which the user belongs for the client terminal 101. In this way, in step S309, the OS 313 of the client terminal 101 obtains the list of printers prepared by the cloud printing service 321 and the device identification information of each printer.

The OS 313 then displays the list of printers on the client terminal 101 based on the information of printers obtained from the cloud printing service 321 and the information of printers detected in the search in the network 107. In a region 402 of FIG. 4, the information of printers received from the cloud printing service 321 is displayed in a list.

The user then selects the information of a printer to be registered in the client terminal 101 from the list of printers displayed in the region 402. Thus, in step S310, the OS 313 queries the cloud printing service 321 for the capability information of the selected cloud printing compatible printer 104. At this time, the query side, that is, the OS 313, determines which attribute to query, similarly to in the above-described mechanism.

Thus, in step S311, the cloud printing service 321 responds to the OS 313 with the capability information of the cloud printing compatible printer 104. The capability information of the cloud printing compatible printer 104 may be the capability information obtained when the printer 104 is registered, or the latest capability information may be obtained from the cloud printing compatible printer 104 when queried from the OS 313. When a response for the attribute queried from the OS 313 of the client terminal 101 is not stored, the cloud printing service 321 does not respond to the OS 313.

The OS 313 then starts installation of the cloud printer driver 311 based on the device identification information and the printer name of the printer 104 selected by the user. In step S312, the OS 313 generates a print queue of the cloud printer driver 311 that has basic device capability information bundled with the OS 313. The device capability information refers to definition information necessary for generating print setting capability information of the printer driver, such as those described in XML (e.g., PrintDeviceCapabilites).

FIGS. 6A-1 and 6A-2 are diagrams illustrating an example of device capability information bundled with the OS 313.

For example, as indicated by reference numeral 601, "PageMediaSize" representing paper sizes described in "Feature" representing a function only has two capabilities, "A4" and "LETTER", described in "Option" representing options. This information is associated with the print queue and is managed by the OS 313.

The OS 313 then updates the device capability information included the cloud printer driver 311 using the capability information obtained from the cloud printing service 321.

FIGS. 6B-1 to 6B-3 and 6C are diagrams illustrating an example of device capability information updated using capability information obtained from the cloud printing service 321.

For example, as indicated by reference numeral 602, "Option" other than "A4" and "LETTER" are added as paper sizes that can be printed by the cloud printing compatible printer 104 to the "PageMediaSize" representing paper sizes. With the above, the installation of the cloud printer driver 311 is completed.

The OS 313 then begins processing for installing an application associated with the printer 104 and for extending the cloud printing driver.

First, the OS 313 performs processing for appending additional identification information to the device identification information. This is processing necessary when obtaining enhanced setup information file 700 illustrated in FIG. 7 from the online supporting server 105, and the additional identification information needs only be a character string different from typical device identification information.

Therefore, in the embodiment, in order to distinguish the application from applications of other devices, as illustrated in FIG. 7, the OS 313 appends additional identification information (PrinterApp_) indicating that the application corresponds to the printer in the device identification information. "PrinterApp_" is only one example and may be another character string, a number, or a symbol.

As a result, for example, if the device identification information of the cloud printing compatible printer 104 is "device001", the device identification information to which additional identification information has been appended will be "PrinterApp_device001".

FIG. 7 is a diagram illustrating an example of the enhanced setup information file 700 according to the embodiment.

FIG. 7 illustrates an example of the enhanced setup information file 700 describing device identification information that takes into account that "additional identification information will be appended to the device identification information of a cloud printing compatible printer" in additional identification information appending processing. In this example, an application ID (AppID) of the print setting expansion application 312 for cloud printing is "PrinterApp_aaaaaaaaaaa8a!App". The device identification information is set to "PrinterApp_AAAA_BBBB" taking into account that additional identification information ("PrinterApp_") will be appended.

In step S313, the OS 313 transmits the device identification information to which additional identification information has been appended to the online supporting service 351 and requests the online supporting service 351 to search for the enhanced setup information file 700 containing the device identification information to which target additional identification information has been appended. If the additional identification information is not appended, the original device identification information will be used as is, and so, the printer driver of the vendor will be installed. In addition, due to the additional identification information not being appended, the target file cannot be identified in a search for the enhanced setup information file to be described later, and thus, an application ID cannot be extracted.

Meanwhile, by the additional identification information being appended, the target file can be identified in a search for the enhanced setup information file 700, and thus, an application ID can be extracted. As a result of the search, if the online supporting service 351 stores the enhanced setup information file 700 containing the target device identification information, in step S314 the enhanced setup information file 700 is returned to the OS 313. At this time, the content of the enhanced setup information file 700 is written in a registry. In step S315, the OS 313 thus installs the enhanced setup information from the online supporting service 351. In step S316, the OS 313 extracts an application ID from the installed enhanced setup information.

Meanwhile, as a result of the search, if the online supporting service 351 does not store the enhanced setup information file 700 containing the target device identification information, in step S317 the OS 313 completes the installation of the cloud printing driver and aborts the processing for installing an application.

When the application ID is extracted from the installed enhanced setup information in step S316, the OS 313 makes a request to the application management service 331 for an application matching the extracted application ID in step S318. Thus, as a result of the search, if the application management service 331 contains a print setting expansion application matching the requested application ID, in step S319 the application management service 331 returns the print setting expansion application 312 matching the requested application ID to the OS 313. Thus, in step S320, the OS 313 installs the print setting expansion application 312 obtained in step S319 in association with the client-side print queue. Specifically, the application ID is stored in the registry of the OS 313 as the information of the print queue, and when the generated print queue is called, the OS 313 starts the print setting expansion application 312 installed using the information.

Meanwhile, as a result of the search, if the application management service 331 does not contain a print setting expansion application matching the requested application ID, in step S321 the OS 313 completes the installation of the cloud printing driver and aborts the processing for installing an application.

Next, an example of a procedure by a user and a sequence between respective pieces of software and the printing service in the present embodiment will be described with reference to FIG. 8.

FIG. 8 is a diagram illustrating an example of a sequence for explaining processing from performing print settings for the cloud printing compatible printer 104 up to transmission of print data in the embodiment.

The document generation application 315 requests the OS 313 to display an initial print settings screen. The OS 313 displays a print setting screen (FIG. 11) for selecting a print queue as the initial print settings screen.

Figure 11:
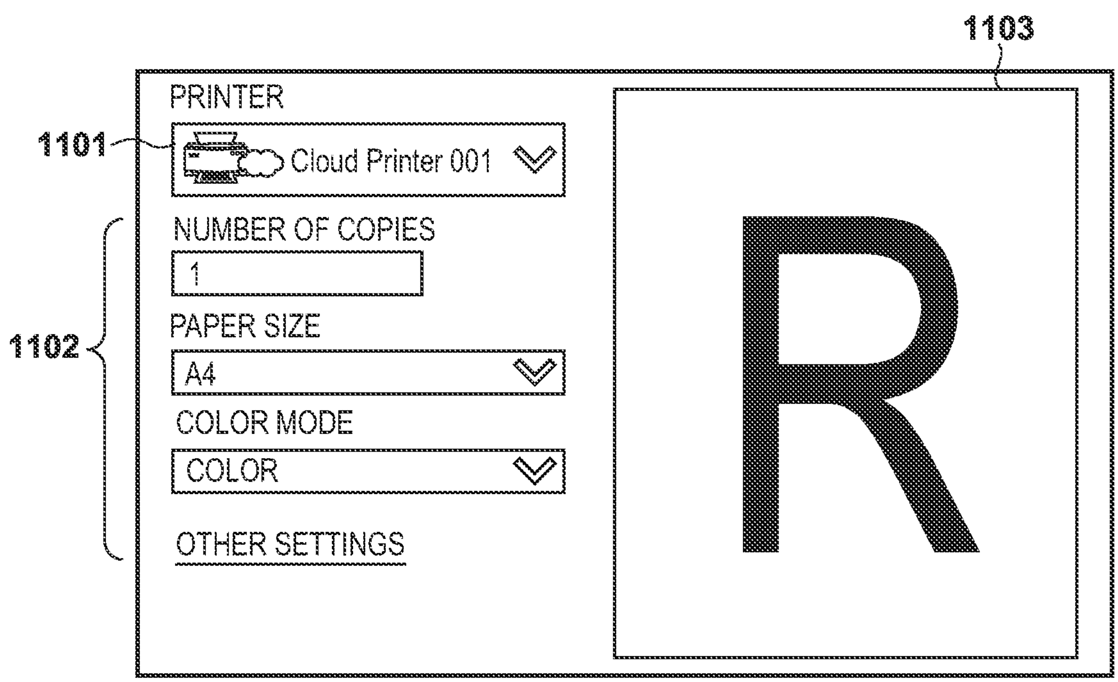
FIG. 11 depicts a view illustrating an example of a print setting screen to be displayed by a document generation application according to the embodiment.

FIG. 11 depicts a view illustrating an example of a print setting screen to be displayed by the document generation application 315 according to the embodiment.

In the embodiment, the OS 313 displays the initial print settings screen, but it does not matter even if the document generation application 315 displays a similar function. The initial print settings screen displays a UI 1101 from which a print queue can be selected, various print setting UIs 1102, and a print preview 1103. The print preview 1103 displays, for example, a pre-mirroring preview image.

In step S801, the OS 313 selects a print queue through the UI 1101 from which the user can select a print queue. Next, in step S802, the OS 313 queries the queue on the cloud that corresponds to the cloud printing compatible printer 104 of the cloud printing service 321 for the capability information of the cloud printing compatible printer 104. The capability information to be queried is determined by the OS 313. The capability information is similar to that described in step S301 of FIG. 3, for example. Regarding the query method, a query to the cloud printing service 321 is performed using an IPP standard protocol, such as Get-printer-Attributes. If Get-printer-Attributes is used, the capability information determined by the OS 313 is queried in a list format.

In step S803, the cloud printing service 321 returns the capability information of the cloud printing compatible printer 104 from the list of capability information transmitted using Get-printer-Attributes as a response to the OS 313 using the same protocol. For example, assume that a media size attribute is designated using Get-printer-Attributes (IPP). If the cloud printing service 321 includes a media size attribute, a value (A4, B5, Letter, etc.) associated with the attribute is returned. If an attribute designated in Get-printer-Attributes is not present in the queue of the cloud printing compatible printer 104 of the cloud printing service 321, the cloud printing Service 321 does not return an associated value.

With this, in step S804, the OS 313 uses the capability information obtained from the cloud printing service 321 to update the device capability information. In the update of the device capability information, the capability information obtained in step S803 of FIG. 8 is added to the device capability generated in step S312 of FIG. 3.

Next, in step S805, the OS 313 notifies the print setting expansion application 312 of an event that device capability information can be edited. Upon receipt of the event, the print setting expansion application 312 can use an Application Programming Interface (API) that allows editing of device capability information. In the case of adding capability information that is not supported by the OS 313, upon the event it is possible to use the print setting expansion application 312 to obtain the capability information from the cloud printing service 321.

Thus, upon receiving the event for editing the device capability information from the OS 313, in step S806 the print setting expansion application 312 queries the capability information of the cloud printing compatible printer 104 through the cloud printing service 321. At this time, the print setting expansion application 312 queries unique capability information, which is separate from the capability information queried by the OS 313 stored in the print setting expansion application 312. For example, “staple-less binding”, “saddle folding”, and the like, which are vendor-specific settings, correspond to the unique capability information in this case. Regarding the query method, “staple-less binding” and “saddle folding” can be designated using Get-printer-Attributes, similarly to step S802 of FIG. 8. Here, the addition of options for a function is illustrated, but needless to say, it is similar even when newly adding a function itself. Even when newly adding a function itself, if the cloud printing compatible printer 104 supports the function and is registered in the cloud printing service 321, the function can be obtained from the cloud printing service 321 by inputting the function name in the list format of Get-printer-Attributes.

Upon a query for unique capability information from the print setting expansion application 312, in step S807 the cloud printing compatible printer 104 returns the capability information to the print setting expansion application 312 via the cloud printing service 321. The response method here is similar to that of the previously-described step S311 of FIG. 3.

Upon obtaining the capability information of the cloud printing compatible printer 104 through the cloud printing service 321, in step S808 the print setting expansion application 312 edits the device capability information through a configuration information object. The configuration information object is a set of data necessary for editing device capability information. Since the print setting expansion application 312 cannot directly edit the device capability information stored in the OS 313, the configuration information object can be used to change the device capability information stored in the OS 313. The print setting expansion application 312 converts capability information, such as “staple-less binding” or “saddle folding”, obtained in step S807 of FIG. 8 into device capability information and adds the capability information to the configuration information object, thereby editing the device capability information.

Figure 10A:
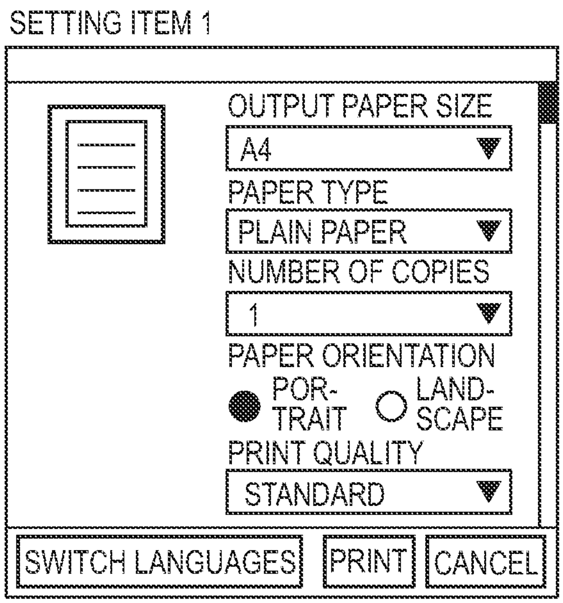
FIGS. 10A to 10D depict views illustrating examples of a print setting screen by the print setting expansion application according to the embodiment.
Figure 10B:
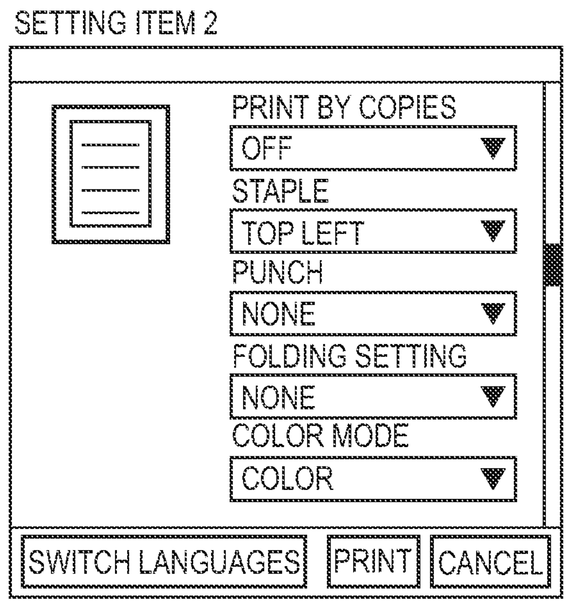
Figure 10C:
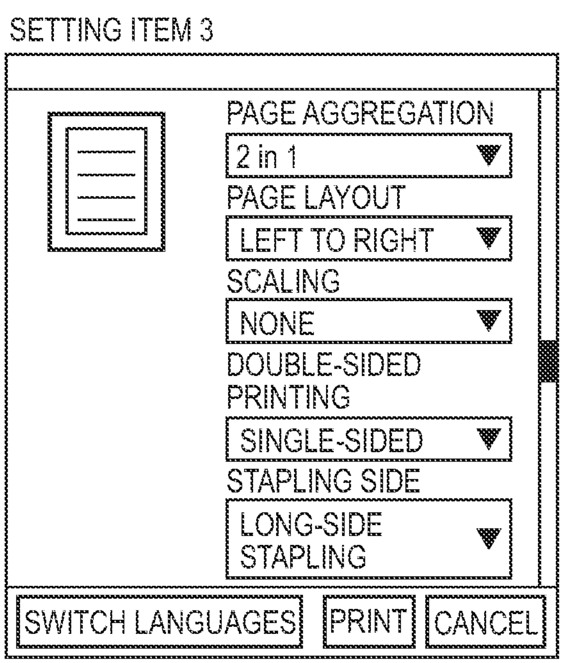
Figure 10D:
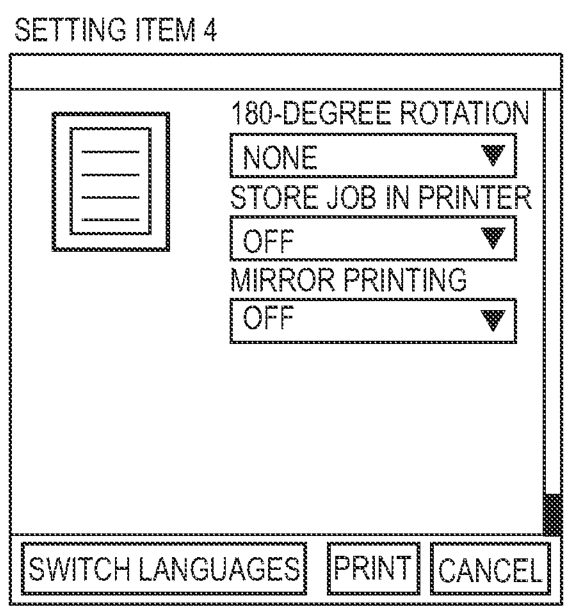

Then, in step S809, the print setting expansion application 312 passes the edited configuration information object to the OS 313. Upon receiving the configuration information object from the print setting expansion application 312, the OS 313 merges the device capability information that is stored in the OS 313 and the device capability information that has been added to the configuration information object from the print setting expansion application 312 and performs an update with it as new device capability information. Thus, upon generating new device capability information, in step S810 the OS 313 enables the print queue, and thereby, a trigger for activating a UI of the print setting expansion application 312 is enabled. In step S811, the print setting expansion application 312 displays a print setting screen as in FIG. 10A when started from the OS 313.

FIGS. 10A to 10D depict views illustrating examples of a print setting screen by the print setting expansion application 312 according to the embodiment.

Figure 9A:
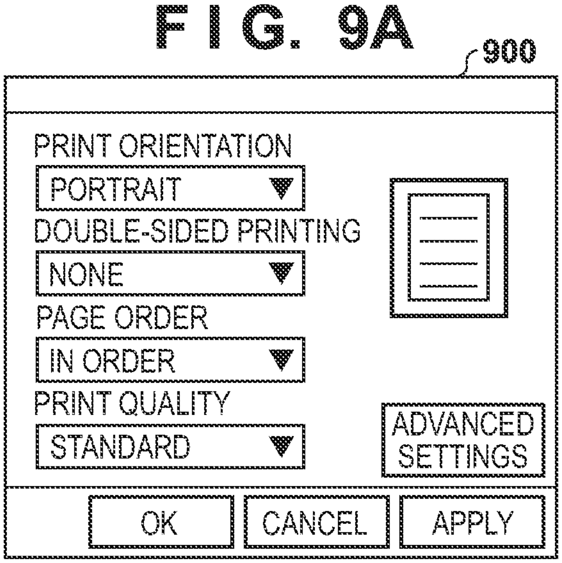
FIGS. 9A to 9E depict views illustrating examples of a print setting screen by a standard driver preinstalled in the OS that is to be displayed when the print setting expansion application is not associated with a cloud printing driver.
Figure 9B:
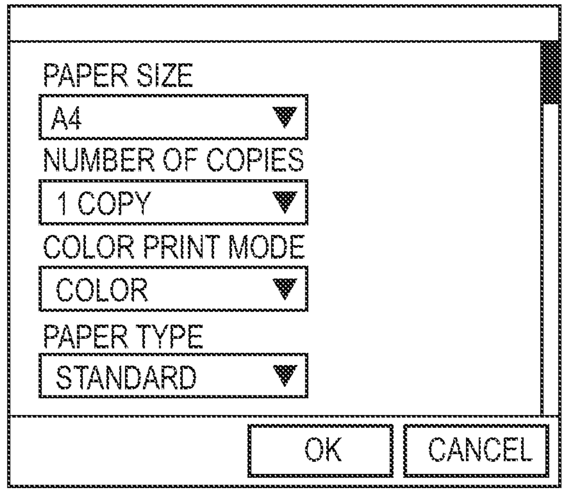
Figure 9C:
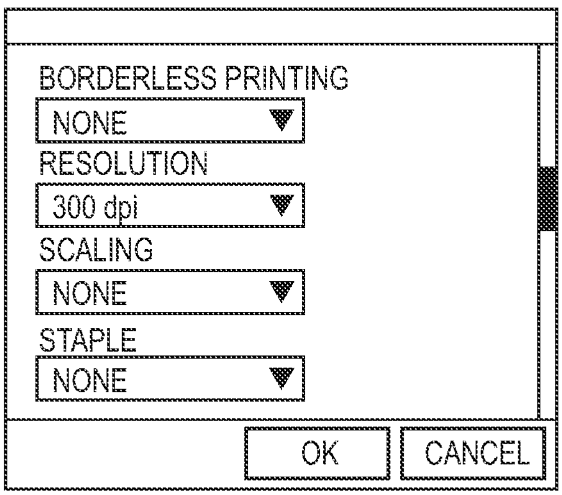
Figure 9D:
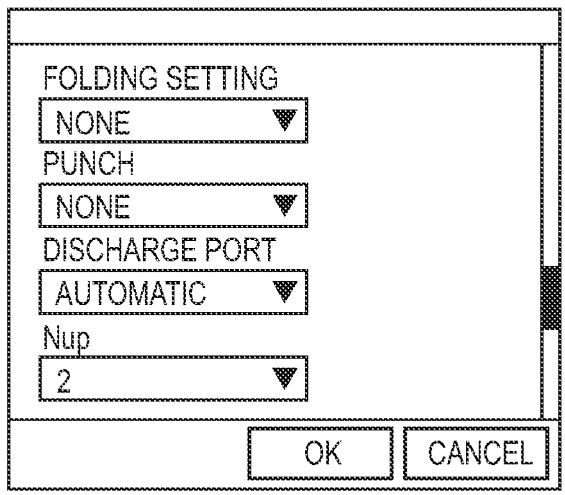
Figure 9E:
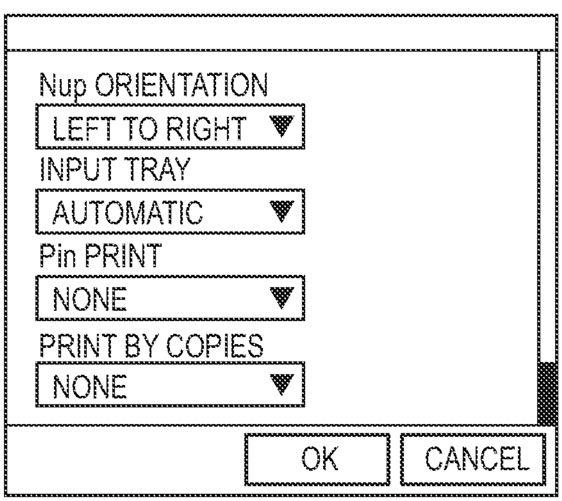

The print setting screen can display the print setting information of each selection item that does not depend on the type of the document generation application 315 to be used. If the print setting expansion application 312 is not associated with the cloud printing driver, a standard driver print setting screen 900 pre-installed on the OS 313 will be displayed as in FIG. 9A. When "advanced settings" is pressed on the standard driver print setting screen 900, standard driver print setting screens (advanced settings) as illustrated in FIGS. 9B to 9E are displayed. Print settings that cannot be fully displayed in the first UI of the standard driver print setting screen 900 are displayed in the standard driver print setting screens (advanced settings).

The print setting expansion application 312 receives the print setting information generated based on the print setting capability information that the OS 313 generated from the device capability information and displays the print setting information as the print settings on the UI. For example, regarding an output paper size of a setting item 1 of FIG. 10A, the print setting expansion application 312 displays the print setting information generated from psk:PageMediaSize in the option denoted by the reference numeral 602 of FIGS. 6B-2 and 6B-3. In addition, the print setting expansion application 312 generates A4, which is an option for the output paper size, based on information called print setting information psk: IOSA4 and displays A4. In this way, the print setting expansion application 312 displays each piece of capability information of the device capability information on the UI.

The print setting expansion application 312 provides a function for the user to change print settings as desired and, if changed, stores those setting values. For example, assume that the user changed the media size from A4 to Letter on the UI. In such a case, the print setting information stored by the print setting expansion application 312 changes from A4 to Letter. When the user completes a print setting operation, the print setting expansion application 312 obtains the print setting information processed in the control of the print setting screen from the print setting screen. The print setting expansion application 312 then passes the obtained print setting information to the OS 313 and completes the processing of the print setting expansion application 312 in the print setting screen (step S812).

In step S813, the OS 313 performs printing by the user instructing printing through the print setting expansion application 312. The OS 313 generates intermediate data when printing is performed. In step S814, the OS 313 passes the generated intermediate data and the print setting information edited in the print setting screen to the print setting expansion application 312. Here, the intermediate data is data generated prior to conversion into print data, such as Page Description Language (PDL), and for example, XML Paper Specification (XPS) corresponds to this. The print setting information edited in step S812 is also included in the intermediate data. That is, the setting of mirror printing is also included in the intermediate data.

Next, a method of editing XPS data for when "mirror printing" (predetermined function), which is a feature of the present embodiment, is designated will be described with reference to a flowchart of FIG. 12 and an example of FixedPage editing of FIG. 13.

Figure 12:
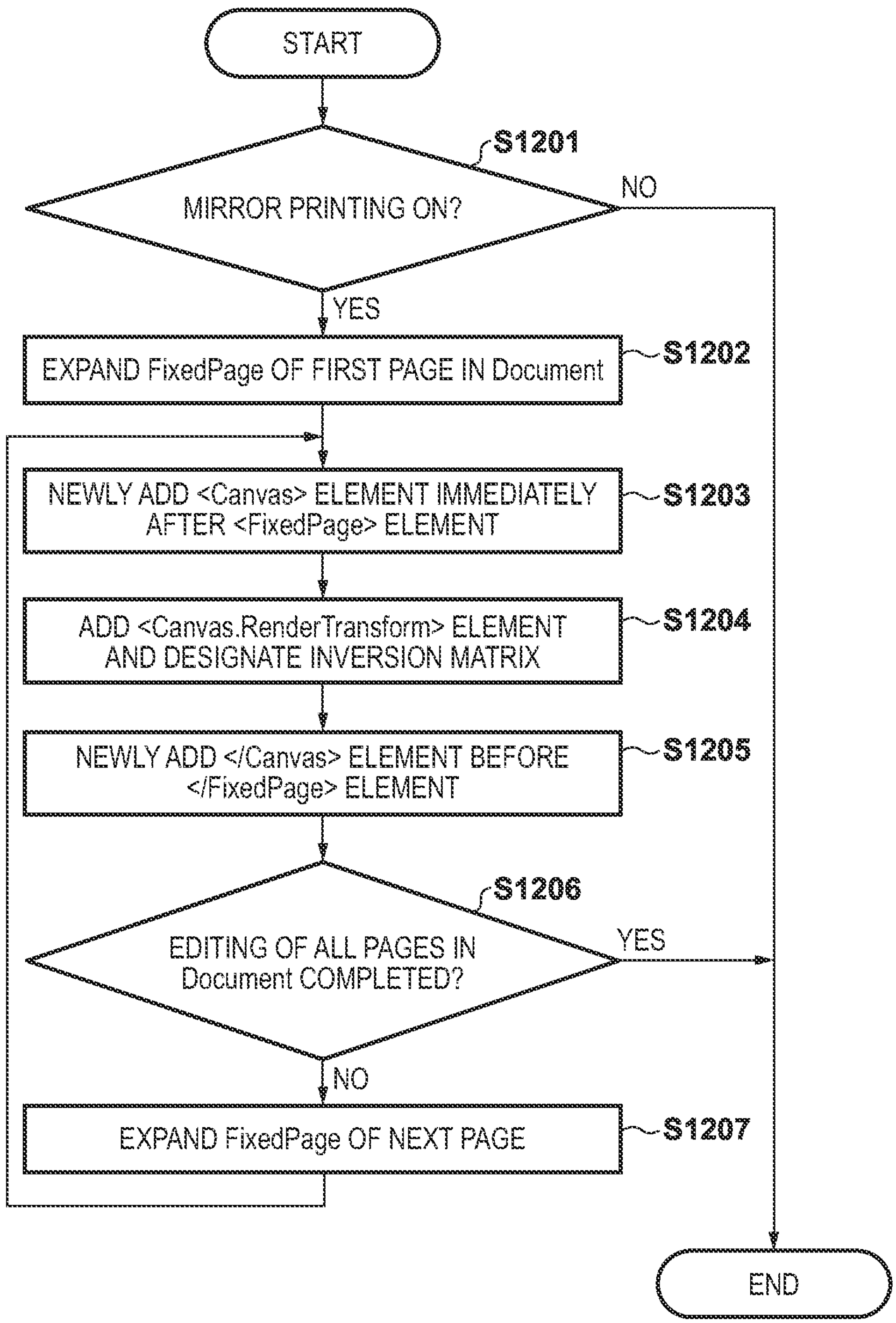
FIG. 12 is a flowchart for explaining editing of XPS data when "mirror printing", which is performed by the client terminal according to the embodiment executing the print setting expansion application, is designated.

FIGS. 13A and 13B are diagrams illustrating an example of XPS data edited in the processing of FIG. 12. FIG. 13A is pre-edit XPS data, and FIG. 13B is edited XPS data.

FIG. 12 is a flowchart for explaining editing of XPS data when "mirror printing", which is performed by the client terminal 101 according to the embodiment executing the print setting expansion application 312, is designated. The processing described in the flowchart is accomplished by the CPU 212 of the client terminal 101 executing the print setting expansion application 312 deployed in the memory 213.

First, in step S1201, the CPU 212 determines whether the "mirror printing" setting is ON based on the print setting information. Here, if it is determined that the "mirror printing" setting is ON, the processing proceeds to step S1202, and if it is determined to be OFF, the XPS data editing processing is terminated. In step S1202, the CPU 212 starts editing FixedPage of the first page in the XPS data document. In step S1203, the CPU 212 adds a new <Canvas> element 1301 (FIG. 13B) immediately after the <FixedPage> element. A <Canvas> element can group child elements, such as <Glyph> and <Path> elements, and thus, a rotation instruction can be set collectively for the child elements.

Figure 14A:
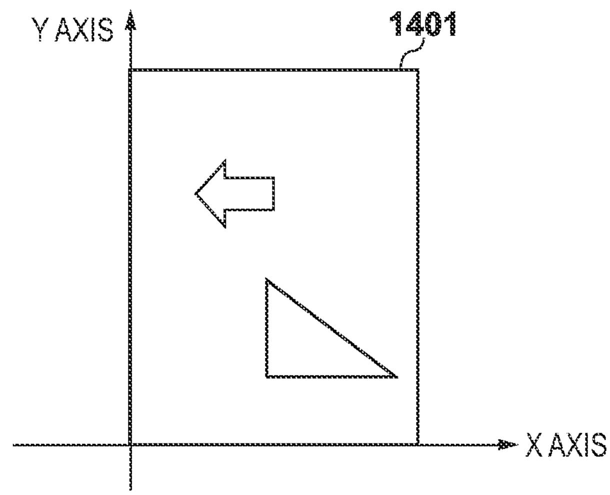
FIGS. 14A and 14B are diagrams illustrating an example of a mirror image by affine transformation.
Figure 14B:
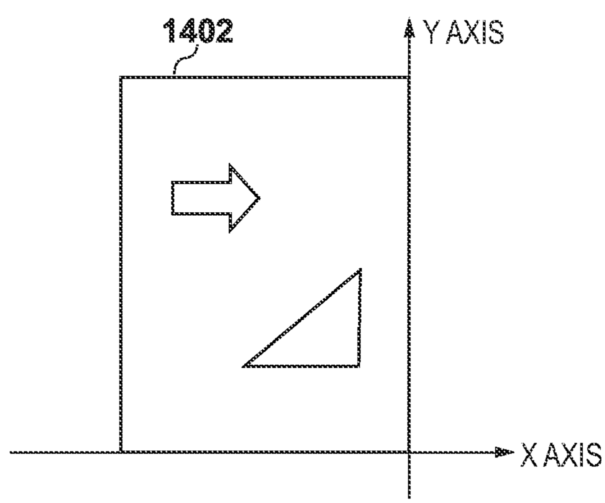

Next, the processing proceeds to step S1204, and the CPU 212 adds a matrix <MatrixTransform Matrix="−1,0,0,1,0, 0"/> 1302 (FIG. 13B), which performs inversion along the y-axis direction in affine transformation matrix transformation using a <Canvas.RenderTransform> component. Here, generation of a mirror image by affine transformation will be described with reference to FIGS. 14A and 14B. A pre-rotation image 1401 of FIG. 14A is an example of a state in which designation of rotation by affine transformation is not included. An image 1402 of FIG. 14B is an example of generating a mirror image inverted along the y-axis by multiplying all elements in <FixedPage> by −1 in the x-axis direction in affine transformation matrix transformation. In the embodiment, assume that when performing inversion processing in an XPS format the inversion processing is performed for each page.

Next, the processing proceeds to step S1205, and the CPU 212 reads to the </FixedPage> component and then adds a new </Canvas> element 1301 immediately therebefore. FIG. 13A illustrates an example of data before FixedPage editing, and FIG. 13B illustrates an example of data after FixedPage editing. The print setting expansion application 312 adds to FIG. 13A a <Canvas> element indicating mirror image inversion from step S1204 to step S1205 at a + position in FIG. 13B. The print setting expansion application 312 performs editing such that inversion processing is reflected in all the child elements such as <Path> and <Glyph> in FixedPage and thus generates XPS data serving as the mirror image 1402 of FIG. 14B.

Then, the processing proceeds to step S1206, and the CPU 212 determines whether editing of all FixedPage in the document has been completed, and if it is determined that it has not been completed, the processing proceeds to step S1207, and when it is determined that editing of all FixedPage has been completed, the processing is terminated. In step S1207, the CPU 212 starts editing FixedPage of the next page and transitions to step S1203.

When editing of the intermediate data by the print setting expansion application 312 is thus completed, in step S815 the print setting expansion application 312 generates print data based on the intermediate data and the print setting information and generates the capability information based on the print setting information. Here, print data refers to PDL, such as a PDF file, and capability information specifically refers to IPP attributes. Then, the processing proceeds to step S816, and the print setting expansion application 312 passes the generated print data and capability information to the print queue of the OS 313.

Here, the processing for when print data is generated by the local printer driver 314 or the cloud printer driver 311 without rendering being performed by the print setting expansion application 312 will be described. In step S817, the OS 313 generates XPS data, edits the page layout, converts the XPS data into a predetermined format, and generates print data. In step S818, the OS 313 transmits the print data and capability information passed from the print setting expansion application 312 to the cloud printing service 321 through the print queue. In step S819, the cloud printing service 321 transmits the print data and capability information passed from the OS 313 to the cloud printing compatible printer 104.

As described above, according to the embodiment, when the print setting expansion application 312 edits XPS data of intermediate data, if the user has set mirror printing, FixedPage is edited to designate inversion processing to each piece of element information in the XPS data. This makes it possible to use mirror printing, which could not be used with a standard driver.

Modification of Embodiment

The present modification describes a method for the print setting expansion application 312 to edit PDF data of print data rather than to edit XPS data of intermediate data. The system configuration illustrated in FIG. 1 is the same as in the above-described first embodiment, and the same reference numerals will be used for parts similar to those of the first embodiment, and description thereof will be omitted. Only the points different from the above-described the first embodiment will be described below.

In step S815 of FIG. 8, upon receiving intermediate data and print setting information from the OS 313, the print setting expansion application 312 generates print data based on the intermediate data and generates capability information based on the print setting information.

Here, a method for the print setting expansion application 312 to edit PDF data after converting XPS data of intermediate data into print data PDF data if the mirror printing setting of the print setting information is designated will be described with reference to a flowchart of FIG. 15 and an example of editing PDF in FIGS. 16A and 16B.

Figure 15:
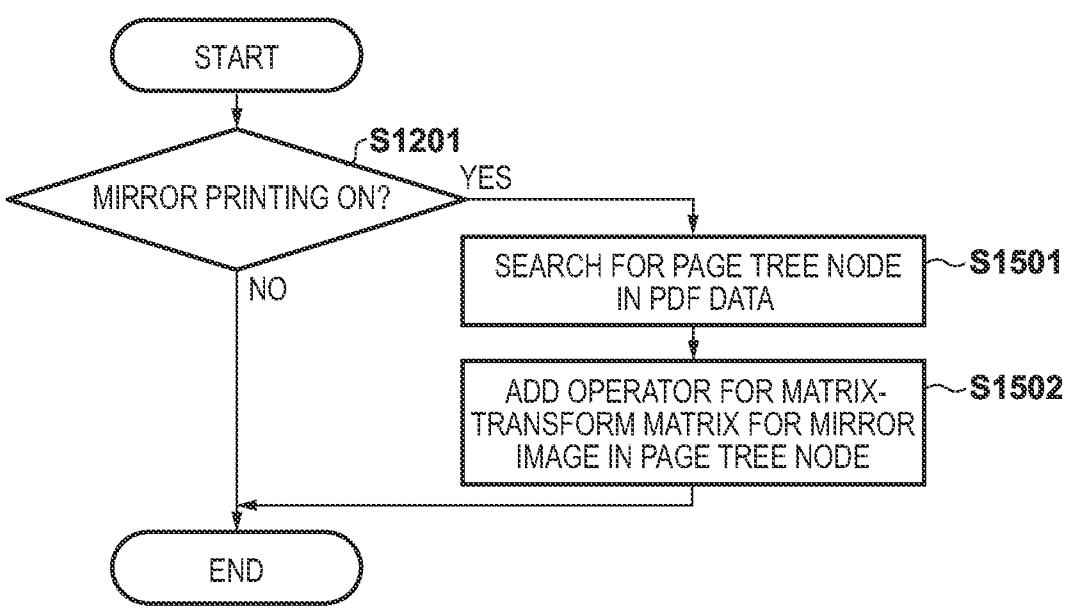
FIG. 15 is a flowchart for explaining an example of processing according to a modification of the embodiment.

In step S1201 of FIG. 15, when it is determined that the "mirror printing" setting is ON based on the print setting information, the print setting expansion application 312 transitions the processing to step S1501. Meanwhile, if it is determined in step S1201 to be OFF, editing of PDF data is terminated. In step S1501, the print setting expansion application 312 searches for a page tree node (/Type/Pages) from the top of the PDF data. Next, the processing proceeds to step S1502, and the print setting expansion application 312 adds a cm operator for a matrix-transform matrix to a data stream (stream) of the page tree node detected in step S1501. Here, the print setting expansion application 312 sets parameters to be set in the matrix-transform matrix of the cm operator to values (−1 0 0 1 0 0) such that inversion along the y-axis direction will be performed in the same manner as in affine transformation of the above-described embodiment. The print setting expansion application 312 designates the matrix-transform matrix in the page tree node and thus reflects the matrix-transform matrix in the object of all subsequent pages. The cm operator indicates rotation processing related to the entire file.

FIG. 16A illustrates an example of PDF data prior to editing by the print setting expansion application 312. FIG. 16B illustrates the print setting expansion application 312 adding a cm operator for a matrix-transform matrix to a page tree node by executing steps S1501 and S1502 of FIG. 15.

The following is similar to the above-described embodiment, and so the description thereof will be omitted. In the present modification, a method of creating mirror printed data by editing PDF data of print data has been described.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-063618, filed Apr. 10, 2023, which is hereby incorporated by reference herein in their entirety.

What is claimed is:

1. A non-transitory computer-readable storage medium storing an application program for causing a processor to execute a method for expanding a function of a printing software included in advance in an operating system (OS), the method comprising:

in a case where an event is notified from the OS, obtaining capability information of a target printing apparatus;

editing, based on the obtained capability information, device capability information stored in the OS;

displaying a print setting screen based on the edited device capability information;

receiving intermediate data including a print setting set via the print setting screen from the OS and determining whether the intermediate data includes a predetermined function, the predetermined function is related to image inversion and not supported by the OS; and in a case where it is determined that the intermediate data includes the predetermined function, editing the intermediate data such that the predetermined function is realized.

2. The storage medium according to claim 1, wherein the intermediate data is expressed in XML Paper Specification (XPS) data.

3. The storage medium according to claim 2, wherein in the editing of the intermediate data, the processor is caused to add a predetermined element to the XPS data, and the predetermined function is defined in the predetermined element.

4. The storage medium according to claim 3, wherein the predetermined element is a Canvas element.

5. The storage medium according to claim 1, wherein the predetermined function is mirror printing.

6. The storage medium according to claim 5, wherein in the editing of the intermediate data, a function of the mirror printing is added by causing the processor to add a Render Matrix element at a beginning of each FixedPage element of XPS data, which is the intermediate data.

7. An information processing apparatus in which an application program is installed on an operating system (OS) configured to obtain printer capability information from a target printing apparatus, the information processing apparatus comprising:

one or more controllers including one or more processors and one or more memories, the one or more controllers that execute the application program configured to:

in a case where an event is notified from the OS, obtain additional capability information from the target printing apparatus;

edit device capability information stored in the OS based on the obtained capability information;

display a print setting screen based on the edited device capability information;

determine whether intermediate data including a print setting set via the print setting screen includes a predetermined function, the predetermined function is related to image inversion and not supported by the OS;

in a case where it is determined that the intermediate data includes the predetermined function, edit the intermediate data such that the predetermined function is realized; and generate print data based on the edited intermediate data.

8. The information processing apparatus according to claim 7, wherein the intermediate data is expressed in XPS data.

9. The information processing apparatus according to claim 8, wherein in the editing of the intermediate data, the one or more controllers are configured to add a predetermined element to the XPS data and define the predetermined function in that predetermined element.

10. The information processing apparatus according to claim 9, wherein the predetermined element is a Canvas element.

11. The information processing apparatus according to claim 7, wherein the predetermined function is mirror printing.

12. The information processing apparatus according to claim 11, wherein in the editing of the intermediate data, the one or more controllers are configured to add a function of the mirror printing by adding a Render Matrix element at a beginning of each FixedPage element of XPS data, which is the intermediate data.

13. A method of controlling an information processing apparatus in which an application program is installed on an operating system (OS) configured to obtain printer capability information from a target printing apparatus, the method comprising:

obtaining additional capability information from the target printing apparatus based on an event notified from the OS;

editing device capability information stored in the OS based on the obtained capability information;

displaying a print setting screen based on the edited device capability information;

determining whether intermediate data including a print setting set via the print setting screen includes a predetermined function, the predetermined function is related to image inversion and not supported by the OS;

in a case where it is determined that the intermediate data includes the predetermined function, editing the intermediate data such that the predetermined function is realized; and generating print data based on the edited intermediate data.

* * * * *